United States Patent
Rácz et al.

(10) Patent No.: US 10,581,944 B2
(45) Date of Patent: Mar. 3, 2020

(54) TRANSMISSION RESOURCE DISTRIBUTION FOR STREAMING OF VARIABLE BITRATE ENCODED MEDIA DATA

(71) Applicant: Telefonaktiebolaget LM Ericsson (publ), Stockholm (SE)

(72) Inventors: Sándor Rácz, Cegléd (HU); Geza Szabo, Kecskemet (HU)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 27 days.

(21) Appl. No.: 15/542,957

(22) PCT Filed: Jan. 23, 2015

(86) PCT No.: PCT/EP2015/051380
§ 371 (c)(1),
(2) Date: Jul. 12, 2017

(87) PCT Pub. No.: WO2016/166169
PCT Pub. Date: Jul. 28, 2016

(65) Prior Publication Data
US 2018/0007106 A1 Jan. 4, 2018

(51) Int. Cl.
G06F 15/16 (2006.01)
H04L 29/06 (2006.01)
H04L 12/24 (2006.01)

(52) U.S. Cl.
CPC ...... *H04L 65/4092* (2013.01); *H04L 41/0896* (2013.01); *H04L 63/00* (2013.01);
(Continued)

(58) Field of Classification Search
CPC . H04L 65/4092; H04L 65/607; H04L 65/604; H04L 63/0428; H04L 63/00;
(Continued)

(56) References Cited

U.S. PATENT DOCUMENTS

2003/0152097 A1 8/2003 Makela
2006/0037057 A1* 2/2006 Xu .................... H04L 29/06027
725/90
(Continued)

FOREIGN PATENT DOCUMENTS

WO 2013151674 A1 10/2013

OTHER PUBLICATIONS

3rd Generation Partnership Project; "Technical Specification Group Services and System Aspects; Transparent end-to-end packet switched streaming service (PSS); 3GPP file format (3GP) (Release 10)," 3GPP TS 26.244, v10.2.0, Technical Specification, Sophia Antipolis, France, Nov. 1, 2011, pp. 1-58.
(Continued)

*Primary Examiner* — Ryan J Jakovac
(74) *Attorney, Agent, or Firm* — Coats + Bennett, PLLC

(57) ABSTRACT

A technique for distributing transmission resources in a media data streaming system is disclosed. A user terminal of the media data streaming system comprises an interface configured to receive a stream of variable bitrate encoded media data via a communications network. The user terminal further comprises a memory storing program code and at least one processing device configured to execute the program code. The program code causes the processing device to determine bitrate variation information for the media data stream and to trigger transmission of the bitrate variation information towards a network component. The network component is configured to trigger dynamic distribution of the transmission resources of the communications network among multiple user terminals dependent on the bitrate variation information.

21 Claims, 6 Drawing Sheets

(52) U.S. Cl.
CPC .......... *H04L 63/0428* (2013.01); *H04L 65/60* (2013.01); *H04L 65/604* (2013.01); *H04L 65/607* (2013.01); *H04L 65/80* (2013.01); *H04L 41/5019* (2013.01); *H04L 41/5067* (2013.01)

(58) Field of Classification Search
CPC ..... H04L 41/0896; H04L 65/80; H04L 65/60; H04L 41/5067; H04L 41/5019
See application file for complete search history.

(56) References Cited

U.S. PATENT DOCUMENTS

| | | | |
|---|---|---|---|
| 2012/0275597 A1* | 11/2012 | Knox | H04L 9/0833 380/210 |
| 2013/0191550 A1* | 7/2013 | Hannuksela | H04N 21/234327 709/231 |
| 2014/0137145 A1 | 5/2014 | Todd | |
| 2014/0137148 A1 | 5/2014 | Marques | |
| 2014/0215085 A1 | 7/2014 | Li | |
| 2016/0014184 A1* | 1/2016 | Rehan | H04L 5/0085 709/219 |
| 2016/0050241 A1* | 2/2016 | Lotfallah | H04L 67/2804 709/219 |

OTHER PUBLICATIONS

ETSI 3rd Generation Partnership Project; "Digital cellular telecommunications system (Phase 2+); Universal Mobile Telecommunications System (UMTS); LTE; Transparent end-to-end packet switched streaming service (PSS); 3GPP file format (3GP) (3GPP TS 26.244 version 10.2.0 Release 10)," ETSI TS 126 244, v.10.2.0, Technical Specification, Sophia Antipolis, France, Jan. 1, 2012, pp. 1-60.

3rd Generation Partnership Project; "Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10)," 3GPP TS 37.320, v10.0.0., Technical Specification, Sophia Antipolis, France, Dec. 1, 2012, pp. 1-17.

* cited by examiner

TRANSMISSION RESOURCE DISTRIBUTION FOR STREAMING OF VARIABLE BITRATE ENCODED MEDIA DATA

TECHNICAL FIELD

The present disclosure generally relates to streaming of variable bitrate encoded media data. In particular, a transmission resource distribution technique for streaming of such media data is described. The present disclosure may be embodied in methods, apparatuses and computer programs.

BACKGROUND

Network operators constantly strive to improve the quality of their services in terms of Quality of Service (QoS) and Quality of Experience (QoE). QoE typically describes a quality perception from the perspective of a user browsing the Internet or rendering a video or audio stream that is received over a communications network from a media server. QoS primarily targets at providing benefits to a terminal operated by a user. These benefits may not, or not directly, be perceivable by the user. Still, QoS enhancements often at the same time result in a better QoE.

In the current $3^{rd}$ Generation Partnership Project (3GPP) architecture, QoS and QoE are supported via the so-called bearer concept. Starting from Release 7 for 3G and Release 8 for Long Term Evolution (LTE), traffic differentiation takes place in the operator networks for QoS and QoE control. Traffic differentiation encompasses the distribution of available transmission resources (e.g., in terms of transmission bandwidth) among multiple user terminals. In general, the network operators take responsibility for setting up the appropriate set of bearers for an individual user terminal and for setting the associated bearer parameters so as to meet certain QoS and QoE targets.

For classifying data traffic and for assigning the classified data traffic to individual bearers for transmission resource distribution, in the downlink direction packet filters (e.g., via Traffic Flow Templates, TFTs) and Deep Packet Inspection (DPI) are commonly applied. The network operators may also upload TFTs to the user terminals to enable an assignment of data traffic to individual bearers in the uplink direction.

Today, an increasing amount of data traffic, such as Over-The-Top (OTT) data traffic, is encrypted. In this regard, end-to-end encryption technologies between the user terminals at the one end and the media servers at the other end are commonly used. Evidently, end-to-end encryption makes it difficult or even impossible for network operators to apply packet filtering or DPI for classifying the data traffic. Under such circumstances, the possibilities of the network operators for providing QoS and QoE enhancements via intelligent transmission resource distribution are significantly reduced.

It would therefore be desirable from the perspective of the network operators to provide traffic differentiation services also in cases in which it is not possible or not desired to implement data traffic classification on the network side. As mentioned above, end-to-end encryption would be one exemplary scenario in which data traffic classification cannot be applied in the operator network.

SUMMARY

Accordingly, there is a need for a technique that avoids one or more of the problems discussed above, or other problems.

In a first aspect, there is provided a user terminal comprising a network interface configured to receive a stream of variable bitrate encoded media data via a communications network. The user terminal further comprises a memory storing program code and at least one processing device configured to execute the program code. The program code causes the processing device to determine bitrate variation information for the media data stream, and to trigger transmission of the bitrate variation information towards a network component that is configured to trigger dynamic distribution of transmission resources of the communications network among multiple user terminals.

The media data stream may comprise at least one of video and audio data. In one variant, the media data stream is end-to-end encrypted from a media server to the user terminal. The present disclosure is, however, not limited to being applied in an end-to-end encryption scenario. In an example in which the media data stream is not encrypted, the present disclosure could be implemented to shift the processing load associated with determining the bitrate variation information from the network side to the terminal side, or for other reasons.

The bitrate variation information may be indicative of how the bitrate changes within a portion of the media data stream or within the entire media data stream. For example, the bitrate variation information may pertain to bitrate variations taking place within a certain play-out interval (as defined by a certain media data volume or a certain time interval). Generally, the bitrate variation information may be indicative of the variable bitrate encoding of (at least a portion of) the media data stream.

The bitrate variation information may be indicative of variable transmission resource requirements for the media data stream. The variable transmission resource requirements may, for example, be defined by a particular QoE target for the user terminal. The QoE target may, for example, be defined based on an estimated or measured fill level of a media data buffer on the side of the mobile terminal.

In one implementation, the bitrate variation information is determined from, or comprises, associations (e.g., mappings) between media data play-out time intervals on the one hand and, on the other hand, media data frame numbers or media data byte ranges. From such associations the network component may derive the variable bitrate encoding of the media data stream as a basis for a dynamic transmission resource distribution.

The memory may store an application configured to render the media data stream. The application may take the form of a browser or an app. In one variant, the application is further configured to store metadata pertaining to the media data. The metadata may, for example, be utilized by the application to ensure a proper play-out of the media data. The bitrate variation information may be determined from or comprise the stored metadata.

The media data stream may be provided to the user terminal in the context of a media streaming session. In certain variants, the program code may cause the processing device to determine and trigger transmission of the bitrate variation information at a beginning of the media streaming session. The program code may cause the processing device to newly determine and trigger transmission of the bitrate variation information while the media data stream is received (e.g., one or multiple times during a media streaming session). For example, the media data stream may be configured to be received by the user terminal in one of several media rendering quality formats. In such a scenario, the program code may cause the processing device to newly determine and trigger transmission of the bitrate variation information upon an upcoming or effected change of the media rendering quality format (e.g., during a particular media streaming session). In one variant, the user terminal receives new metadata upon a change of a media rendering quality format (e.g., via a push or pull concept) and determines new bitrate variation information on the basis of the new metadata.

The media data stream may be received at the user terminal via one or more dedicated communication sockets. In such an implementation, the program code may cause the processing device to determine at least one communication socket at the user terminal assigned to reception of the media data stream. In a further step, transmission of information indicative of the at least one communication socket to the network component may be triggered.

According to a further aspect, a network component configured to trigger dynamic distribution of transmission resources of a communications network among multiple user terminals for one or more streams of variable bitrate encoded media data is provided. The network component comprises an interface configured to receive bitrate variation information for at least one of the one more media data streams from at least one of the user terminals. The network component further comprises a memory storing program code and at least one processing device configured to execute the program code. The program code causes the processing device to trigger a distribution of the transmission resources among the user terminals dependent on the bitrate variation information.

The network component may further be in charge of transmission resource distribution. In such a case an internal entity of the network component will be triggered. In another variant, the network component may be configured to trigger another network component to distribute the transmission resources among the user terminals dependent on the bitrate variation information.

The media data stream may be end-to-end encrypted from a media server to the user terminal. As such, the network component may be prevented from applying data traffic classification techniques, such as DPI, itself.

The distribution of transmission resources triggered by the processing device may further be dependent on one or more additional parameters, such as network load information (i.e., from the perspective of the network component), terminal-specific information regarding an individual user policy (e.g., as defined by subscription data), transmission channel information (e.g., in terms of transmission channel fluctuations), and fill level information about a terminal-side media data buffer (e.g., of a media data rendering application).

The program code may cause the processing device to trigger the distribution of the transmission resources among the user terminals by assigning weights. Specifically, media data queuing weights may be assigned to the user terminals dependent on the respective bitrate variation information.

The media data queuing weights may be configured to control a scheduler in charge of scheduling the forwarding of the media data streams as received from one or more media servers to the user terminals. As such, the scheduler may be in charge of transmission resource distribution among the user terminals. The scheduler may be co-located with the network component triggering transmission resource distribution or may be located on another network component.

The transmission resource distribution as performed, for example, by the scheduler may effect transmission bitrate assignments to the mobile terminals. The transmission bitrate assignments may, for example, be realized via the bearer concept (i.e., in accordance with 3G or LTE) or in any other manner.

The interface of the network component may be configured to receive information indicative of at least one communication socket at the user terminal assigned to reception of the media data stream. The program code may cause the processing device to take into account the at least one communication socket during distribution of the transmission resources among user terminals dependent on the bitrate variation information.

The network component can be located in any portion of the communications network. In one variant, the network component is located in an access network of a wireless communications system. The wireless communications system may be a cellular or a non-cellular communications system.

Also provided is a media streaming system comprising at least one user terminal as presented herein as well as the network component presented herein. The media data streaming system may additionally comprise a network component in charge of transmission resource distribution. Still further, the media data streaming system may comprise one or more media servers.

According to a further aspect, a method of operating a user terminal configured to receive a stream of variable bitrate encoded media data via a communications network is provided. The method comprises determining bitrate variation information for the media data stream and triggering transmission of the bitrate variation information towards a network component that is configured to trigger dynamic distribution of transmission resources of the communications network among the multiple user terminals.

Still further, a method of operating a network component configured to trigger dynamic distribution of transmission resources of a communications network among multiple user terminals for one or more streams of variable bitrate encoded media data is provided. The method comprises receiving bitrate variation information for at least one the one or more media streams from at least one of the user terminals, and triggering a distribution of the transmission resources among the user terminals dependent on the bitrate variation information.

The methods of operating the user terminal and the network component, respectively, according to the above aspects may comprise one or more additional steps disclosed herein.

In a further aspect, there is provided a computer program product comprising program code portions for performing the method aspects presented herein when the computer program product is executed on one or more computing devices. The computer program product may be stored on a computer readable recording medium, such as a semiconductor memory, DVD, CD-ROM, and so on. The computer program product may also be provided for download via a communications network (e.g., the Internet or a proprietary network).

BRIEF DESCRIPTION OF THE DRAWINGS

Embodiments of the technique presented herein are described herein below with reference to the accompanying drawings, in which.

DETAILED DESCRIPTION

In the following description, for purposes of explanation and not limitation, specific details are set forth (such as particular signalling steps and network protocols) in order to provide a thorough understanding of the techniques presented herein. It will be apparent to one skilled in the art that the present disclosure may be practiced in other embodiments that depart from these specific details. For example, the embodiments will partially be described in the context of $3^{rd}$ Generation (3G) or $4^{th}$ Generation/Long Term Evolution (4G/LTE) access networks; however, this does not rule out the use of the present disclosure in connection with (future) network access technologies or in other communications networks or network portions.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that when the following embodiments are described in the context of methods and method steps, the technique presented herein may also be embodied in a computer program product as well as in a system comprising a computer processor and a memory coupled to the processor, wherein the memory is encoded with one or more programs that cause the processor to execute the services, functions and steps disclosed herein.

Some of the following embodiments exemplarily focus on a mobile broadband environment in which user terminals share common radio resources in a cell of a radio access network. In this environment, QoE is influenced by the competition between the user terminals on the radio bottleneck. Some of the following embodiments demonstrate QoE enhancement possibilities with the cooperation of the radio access network and the mobile terminals to mitigate the radio bottleneck. The present disclosure is, of course, not restricted to be implemented in connection with a radio access network.

Figure 1:
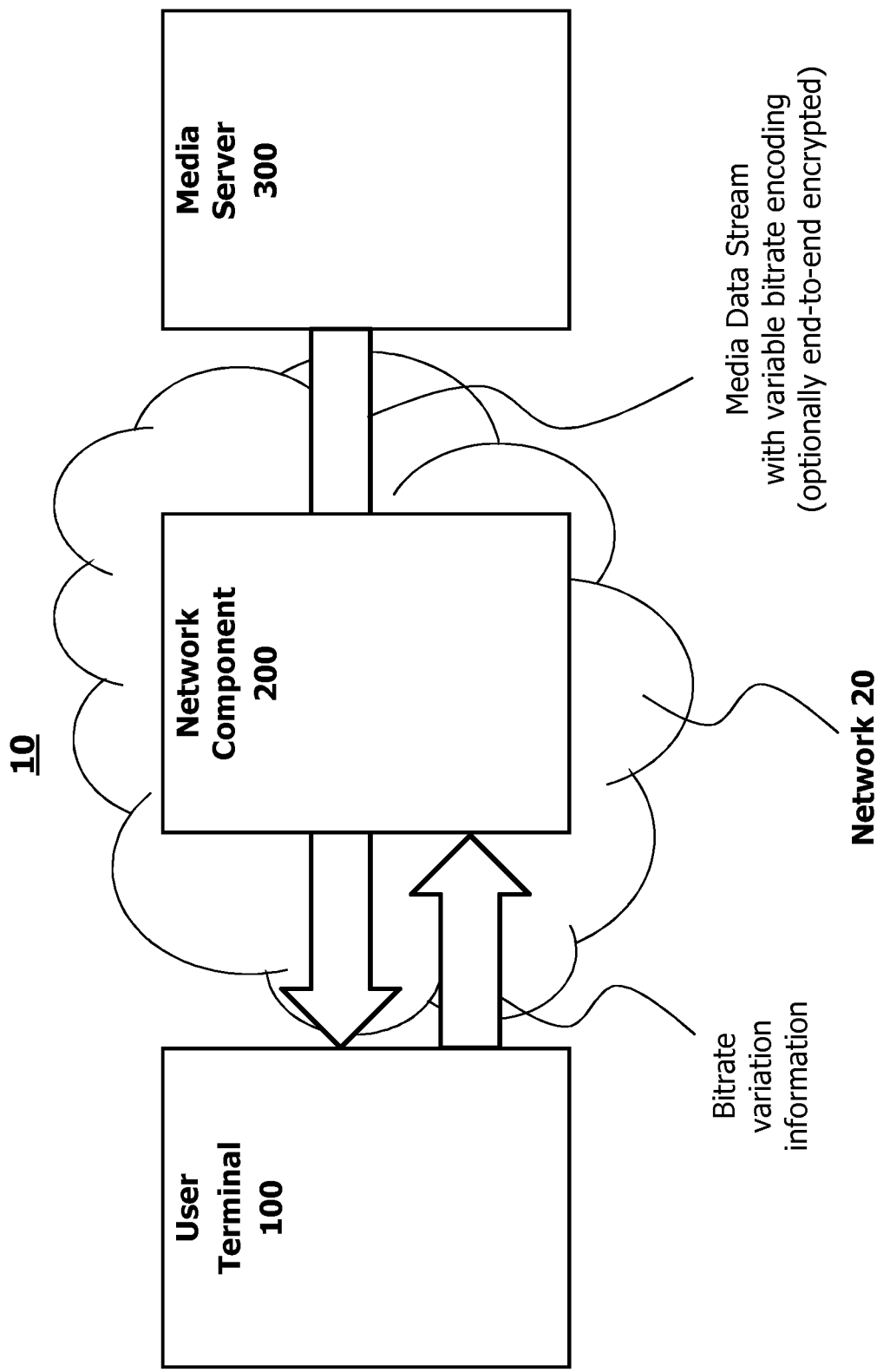
FIG. 1 illustrates an embodiment of a media data streaming system.

FIG. 1 shows an embodiment of a media data streaming system 10 in which aspects of the present disclosure can be implemented. The media data steaming system 10 comprises at least one user terminal 100 and typically a large number of user terminals 100. The system 10 further comprises at least one network component 200 located in a communications network 20 and at least one media server 300. In certain variants, the at least one media server 300 may constitute a component of the communications network 20 (i.e., it may be located within the communications network 20).

In one exemplary scenario, the network 20 is a cellular radio access network and the at least one network component 200 is deployed on a node of the cellular radio access network. The access network node may take the form of a radio base station (e.g., a NodeB or and eNodeB), or a Radio Network Controller (RNC), or a cloud-based virtual node.

As shown in FIG. 1, the media server 300 is configured to provide one or more media data streams with variable bitrate encoding via the communications network 20 to the user terminal 100. In one variant, the media data stream is end-to-end encrypted from the media server 300 to the user terminal 100. The media data stream will then transparently be routed through the communications network 20.

The communications network 20 is configured to dynamically distribute transmission resources of the communications network 20 among multiple user terminals 100 for one or more media data streams provided by the at least one media server 300. As illustrated in FIG. 1, the transmission resource distribution is performed dependent on bitrate variation information received from the user terminal 100. The bitrate variation information is indicative of the variable bitrate encoding of the media data stream received at the user terminal 100 and permits an efficient transmission resource distribution within the communications network 20 so as to maintain target QoEs for multiple user terminals 100 coupled to the communications network 20.

Figure 2:
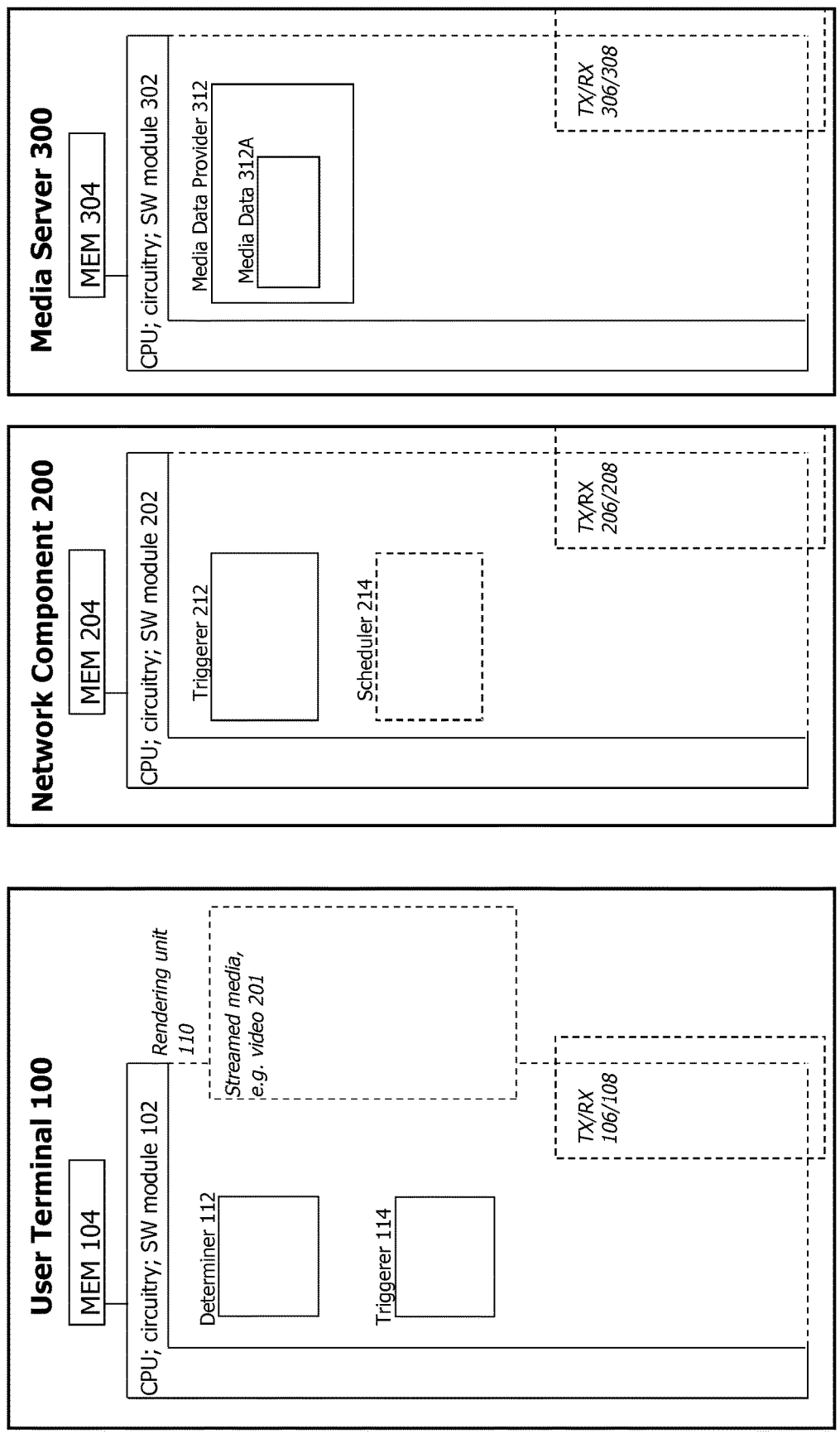
FIG. 2 illustrates embodiments of a user terminal, a network component and a media server of the media data streaming system illustrated in FIG. 1.

FIG. 2 shows implementation embodiments of the user terminal 100, the network component 200 and the media server 300 of FIG. 1. It will be appreciated that the user terminal 100, the network component 200 and the media server 300 presented herein are not limited to the implementations illustrated in FIG. 2. In FIG. 2, optional components are indicated by dashed lines and in italics.

As shown in FIG. 2, the user terminal 100 comprises a core functionality (e.g., one or more of a Central Processing Unit, CPU, dedicated circuitry and/or a software module) 102, a memory 104, a transmitter 106, a receiver 108 and a rendering unit 110 (e.g., a display screen and/or loudspeaker). Moreover, the user terminal 100 comprises a determiner 112 and a triggerer 114. The user terminal 100 may take the form of any wireless or wirebound user terminal, such as a smartphone, a tablet computer, a notebook computer, a vehicle-based terminal or a PC.

In a similar manner, the network component 200 comprises a core functionality (e.g., one or more of a CPU, dedicated circuitry and/or a software module) 202, a memory 204, a transmitter 206 and a receiver 208. Moreover, the network component 200 comprises a triggerer 212 and a scheduler 214. In other embodiments, the scheduler 214 may be located on a different network component (not shown in FIG. 2) that is coupled to the network component 200 via a communications link.

Finally, also the media server 300 comprises a core functionality (e.g., one or more of a CPU, dedicated circuitry and/or a software module) 302, a memory 304, a transmitter 306 and a receiver 308. Moreover, the media server 300 comprises a media data provider 312 (e.g., a database) for providing media data 312A (e.g., video and/or audio data).

In the following paragraphs, index x=1, 2 or 3 (for the user terminal 100, the object scheduler 200 and the media server 300). As partly indicated by the dashed extensions of the functional blocks of the core functionalities x02, the determiner 112 and the triggerer 114 (of the user terminal 100), the triggerer 212 and the scheduler 214 (of the network component 200) and the media data provider 312 (of the media server 300) as well as the memory x04, the transmitter x06 and the receiver x08 may at least partially be functionalities running on the CPUs x02, or may alternatively be separate functional entities or means (e.g., controlled by the CPUs x02 and supplying the same with information). The transmitter and receiver components x06, x08 may be realized to comprise suitable (hardware and/or software) interfaces. They may further comprise suitable signal generation and evaluation functions.

The CPUs x02 may be configured, for example, using software residing in the memories x04, to process various data inputs and to control the functions of the memories x04, the transmitter x06 and the receiver x08 (as well as of the determiner 112 and triggerer 114 of the user terminal 100, the triggerer 212 and the scheduler 214 of the network component 200 and the media data provider 312 of the media server 300). The memories x04 may serve for storing program code for carrying out the methods and method steps according to the aspects disclosed herein, when executed by the CPUs x02.

It is to be noted that the transmitter x06 and the receiver x08 may be provided as an integral transceiver, as is indicated in FIG. 2. It is further to be noted that the transmitters and receiver x06, x08 may be implemented as physical transmitters and receivers x06, x08 for transceiving via an air interface or a wired connection, as routing/forwarding entities/interfaces between system entities 100, 200, 300, as functionalities for writing/reading information into/from a given memory area or as any suitable combination of the above. At least one of the determiner 112 and the triggerer 114 of the user terminal 100, the triggerer 212 and the scheduler 214 of the object scheduler 200 and the media data provider 312 of the media server 300, or the respective functionalities, may be implemented as a chipset, module or subassembly.

Figure 3:
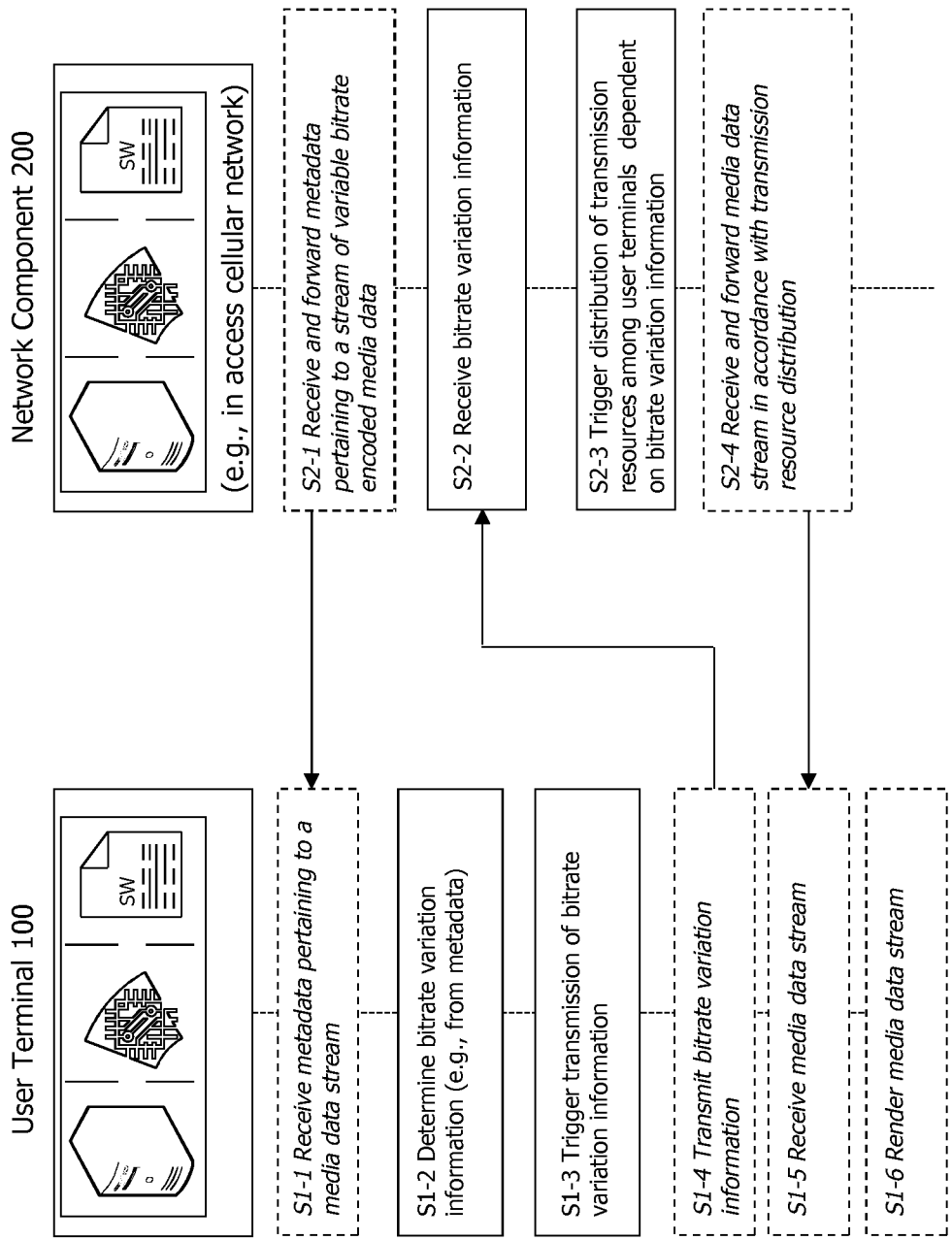
FIG. 3 illustrates method embodiments which also reflect the interaction between the user terminal and the network component of FIGS. 1 and 2.

FIG. 3 shows method embodiments which also reflect the interaction between the system entities 100, 200 shown in FIGS. 1 and 2. In the signalling diagram of FIG. 3, time aspects between signalling steps are reflected in the vertical arrangement of the signalling step sequence as well as in the sequence numbers. It is to be noted that the time aspects indicated in FIG. 3 do not necessarily restrict any one of the method steps shown to the particular step sequence outlined in FIG. 3. This applies in particular to method steps that are functionally disjunctive with each other. The steps indicated in italics and by dashed lines in FIG. 3 and in the other embodiments are optional and can thus be omitted or can be replaced by other steps.

The media data streaming in the method embodiments described below with reference to FIG. 3 can be performed in connection with any media data streaming protocol. The media data streaming protocol may be based on the Hypertext Transfer Protocol (HTTP). As an example, the Dynamic Adaptive Streaming over HTTP (DASH) protocol as specified in 3GPP TS 26.247 may be used. Alternatively, or in addition, the media data streaming may be governed by a file delivery protocol such as FLUTE (File Delivery over Unidirectional Transport). FLUTE is defined in the Internet Engineering Task Force (IETF) document RFC 6726 of November 2012. FLUTE and DASH can be integrated in certain embodiments in a hybrid broadcast/unicast streaming technology.

With reference to FIG. 3, the user terminal 100 receives in step S1-1 metadata pertaining to a media stream via the receiver 108. The metadata pertain to a stream of variable bitrate encoded media data provided by the media server 300 (see FIGS. 1 and 2). The metadata received in step S1-1 by the user terminal 100 can be embedded into the media stream or can be received separate from (e.g., prior to) the media data stream.

As shown in FIG. 3, the metadata received by the user terminal 100 in step S1-1 may have been forwarded to the user terminal 100 by the network component 200 in an optional step S2-1. In case the media data stream is encrypted, the metadata will be forwarded by the network component 200 in a transparent manner.

The metadata received in step S1-1 by the user terminal may control media data rendering by a media data rendering application stored in the memory 104 of the user terminal 100. As an example, the media data rendering application may take the form of a web browser or an app. The metadata may be stored in an application cache.

In one exemplary realization, the metadata received in step S1-1 conform to ETSI TS 126 244 V10.2.0, that defines a transparent end-to-end packet switched streaming service and a 3GPP file format. As an example, the metadata may correspond to one or more boxes, or information derived therefrom, as defined in Section 13 of ETSI TS 126 244 V10.2.0.

In a further step S1-2, the user terminal 100 determines bitrate variation information for the media data stream. The bitrate variation information is in one variant determined from the metadata received in step S1-1. As an example, the Segment Index Box defined in Section 13.4 of ETSI TS 126 244 V10.2.0 contains associations (or mappings) between media data play-out time intervals on the one hand and media data byte ranges on the other hand for individual media segments (i.e., media data stream portions). From that information in the Segment Index Box, or from information derived therefrom, the variable bitrate encoding of the media data stream (i.e., the bitrate variation information) can be determined.

The bitrate variation information determined in Step S1-2 will be indicative of how the encoding bitrate varies, or changes, over a particular duration (i.e., portion) of the media data stream. The bitrate variation information will thus be indicative of variable transmission resource requirements for the media data stream. As will be appreciated, to achieve the same QoE level, media data stream portions of higher bitrate encoding will require more transmission resources than media data stream portions of lower bitrate encoding.

In a further step S1-3, the user terminal 100 triggers transmission of the bitrate variation information determined in step S1-2 towards the network component 200. As an example, the transmitter 106 may be triggered in step S1-3 to transmit the bitrate variation information determined in step S1-2 to the network component 200.

The transmission step S1-4 may take place once or repeatedly. As an example, the bitrate variation information may be transmitted (e.g., once) at the beginning of a media streaming session. Additionally, or as an alternative, steps S1-1, S1-2, S1-3 and S1-4 may be repeatedly performed while the media data stream is received. In one variant, the steps are repeated upon a change of a media rendering quality format (that will generally also change the variable bitrate encoding). As such, steps S1-1, S1-2, S1-3 and S1-4 may be repeated upon an upcoming or effected change of the media rendering quality format. For each media rendering quality format change, new metadata may be received in step S1-1. For example, the user terminal 100 may specifically request the new metadata (pull scenario), or may simply receive the new metadata without specific solicitation (push scenario).

The bitrate variation information transmitted in step S1-4 is received in step S2-2 by the network component 200 via the receiver 208. In a further step S2-3, the network component 200 triggers a distribution of transmission resources among the user terminals 100 dependent on the bitrate variation information received from the user terminal 100. The distribution in step S2-3 may be an initial distribution or a re-distribution following an initial distribution of the transmission resources.

Responsive to triggering step S2-3, the actual transmission resource distribution is either effected by the network component 200 itself or by another component in the network 20 (see FIG. 1) coupled to the network component 200. As an example, transmission resource distribution may be performed by the scheduler 214 shown in FIG. 2 to effect transmission bitrate assignments to the mobile terminals 100 based on the bitrate variation information received from one or more of the user terminals 100. A such, the actual transmission resource distribution among multiple user terminals 100 may take into account bitrate variation information received from more than one user terminal 100. The transmission resource distribution will result in a (e.g., bearer-based) traffic differentiation, that takes into account the variable bitrate encoding of one ore multiple media data streams.

After the transmission resource distribution triggered in step S2-3 has been performed, the network component 200 (or a network component that is co-located with the network component 200 in the network 20) receives, or continues to receive, the media data stream in step S2-4 via the receiver 208. Furthermore, the media data stream is forwarded in accordance with the triggered transmission resource distribution via the transmitter 206 to the user terminal 100.

Next, the user terminal 100 receives the media data stream via the receiver 108 in accordance with the triggered transmission resource distribution in step S1-5. In a further step S1-6, the media data stream received in step S1-5 is rendered via the rendering unit 110 (see FIG. 2) under control of the media data rendering application stored in the memory 104.

In the scenario depicted in FIG. 3, a possible end-to-end encryption is no obstacle for a transmission resource distribution in the network 20 because the bitrate variation information is available at the user terminal 100 in an un-encrypted form and can thus be signalled to the "intermediate" network 20. That is, the transmission resource distribution approach depicted in FIG. 3 can also be performed in cases in which the media data stream (and the associated meta data) are forwarded transparently by the network component 200 to the user terminal 100.

The transmission resource distribution by the network component 200 can be performed such that a media play-out buffer at the user terminal 100 (e.g., arranged within the memory 104) can be kept at a stable fill level. As such, a target QoE can be maintained during the whole media streaming session.

The components within the communications network 20 obtain the bitrate variation information from the user terminals 100, which means that no data traffic classification processing is needed within the communications network 20. Still, the resources of the communications network 20 can be efficiently distributed among multiple user terminals 100.

The proposed solution does not harm privacy in any way has no privacy-related information needs to leak out of the user terminals 100. Rather, the network component 200 only requires abstract bitrate variation information (e.g., in the form of a time-range mapping between media data play-out time intervals and media data byte ranges). Based on such information, a stable QoE can be realized as the buffer filling mechanism of the mobile terminal 100 can insure that the buffer capacity freed by media data play-out can synchronously be filled with new media data (e.g., via chunk retrieval).

The mechanism for carrying out steps S1-2 and S1-3 on the side of the user terminal 100 can be realized as an application (e.g., an operating system-dependent app) within the memory 104. A such, the technique presented herein can be implemented on the user terminal 100 via a software update or an app download.

Figure 4:
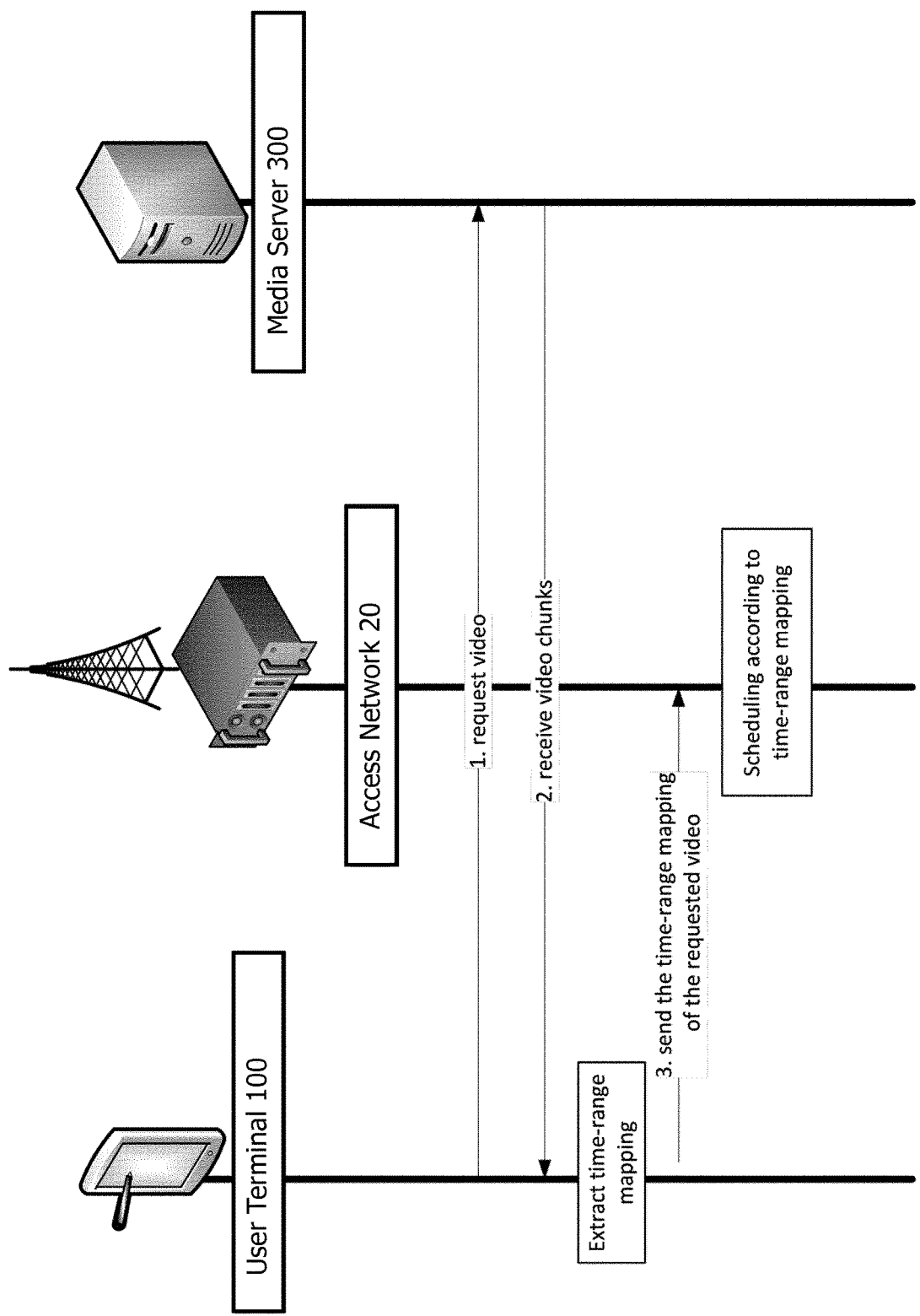
FIG. 4 illustrates a signalling embodiment in an exemplary media data streaming scenario.

FIG. 4 illustrates a more detailed embodiment of the media data streaming system 10 shown in FIG. 1. A such, the embodiments illustrated in FIG. 4 can be combined with any of the features discussed above with reference to FIGS. 1 to 3.

In the exemplary system exemplarily shown in FIG. 4, it will be assumed that the user terminal 100 is configured to wirelessly connect to the access network 20 (e.g., via an LTE interface) to request a video stream from the media server 300. The media server 300 may be configured as a web server within the Internet.

As illustrated in FIG. 4, the user terminal 100 in an initial step requests from the media server 300, via the access network 20, a particular video for streaming. In a second step, the user terminal 100 receives the requested video in the form of individual chunks from the media server 300 (again via the access network 20). In this regard, the FLUTE protocol may be implemented.

An initial (or later) video chunk received during the streaming session by the user terminal 100 contains bitrate variation information such as a time-range mapping. As an example, the time-range mapping may be extracted from a Segment Index Box according to ETSI TS 126 224 V10.2.0.

Two exemplary mappings between media play-out time intervals and media data byte ranges for different framing types are illustrated below:

itag=140 Mp4
Length: 72.49 sec
Time-range mapping
  10.0=159410, 20.0=318132, 29.0=476740, 39.0=635660, 49.0=794686, 58.0=953392, 68.0=1111785, 70.0=1151317
itag=243 WebM
Length: 72.4 sec (640×360)
Time-range mapping
  0.0=416, 5.4=91361, 10.8=179463, 16.2=261854, 21.6=389559, 27.0=511121, 32.4=616547, 37.8=701780, . . . .

The extracted time-range mapping of the requested video is then sent by the user terminal 100 to the access network 20 (e.g., in the form of a short data chunk). The access network 20 is thus enabled to schedule distribution of its transmission resources in accordance with the time-range mapping received from the user terminal 100 (and potentially from one or more further user terminals 100) as generally explained with reference to FIG. 3 above.

The communication between the user terminal and the access network 20 (e.g., the network component 200) for signalling the bitrate variation information can be done on the basis of a dedicated communication socket between the user terminal 100 and the access network 20 (e.g., the network component 200). Alternatively, the communication of the bitrate variation information can also be performed using radio signalling (e.g., via Minimization of Drive Tests, MDT) or via Internet Protocol (IP) packets (e.g., in an IP header field a such as a Type of Service, ToS, field).

The bitrate variation information transmitted from the user terminal 100 to the communication network 20 typically comprises several hundred bits. The transmission of the bitrate variation information only affects the uplink direction (that typically has lots of free capacity). It could also be considered to transmit the bitrate variation information in a compressed form. As an example, a general lossless compression algorithm may be used, or some details of the extracted mapping could be omitted. Generally, the data volume of the bitrate variation information transmitted by the user terminal 100 will scale with the size of a particular portion of the media data stream (e.g., 1 to 100 seconds).

Figure 5:
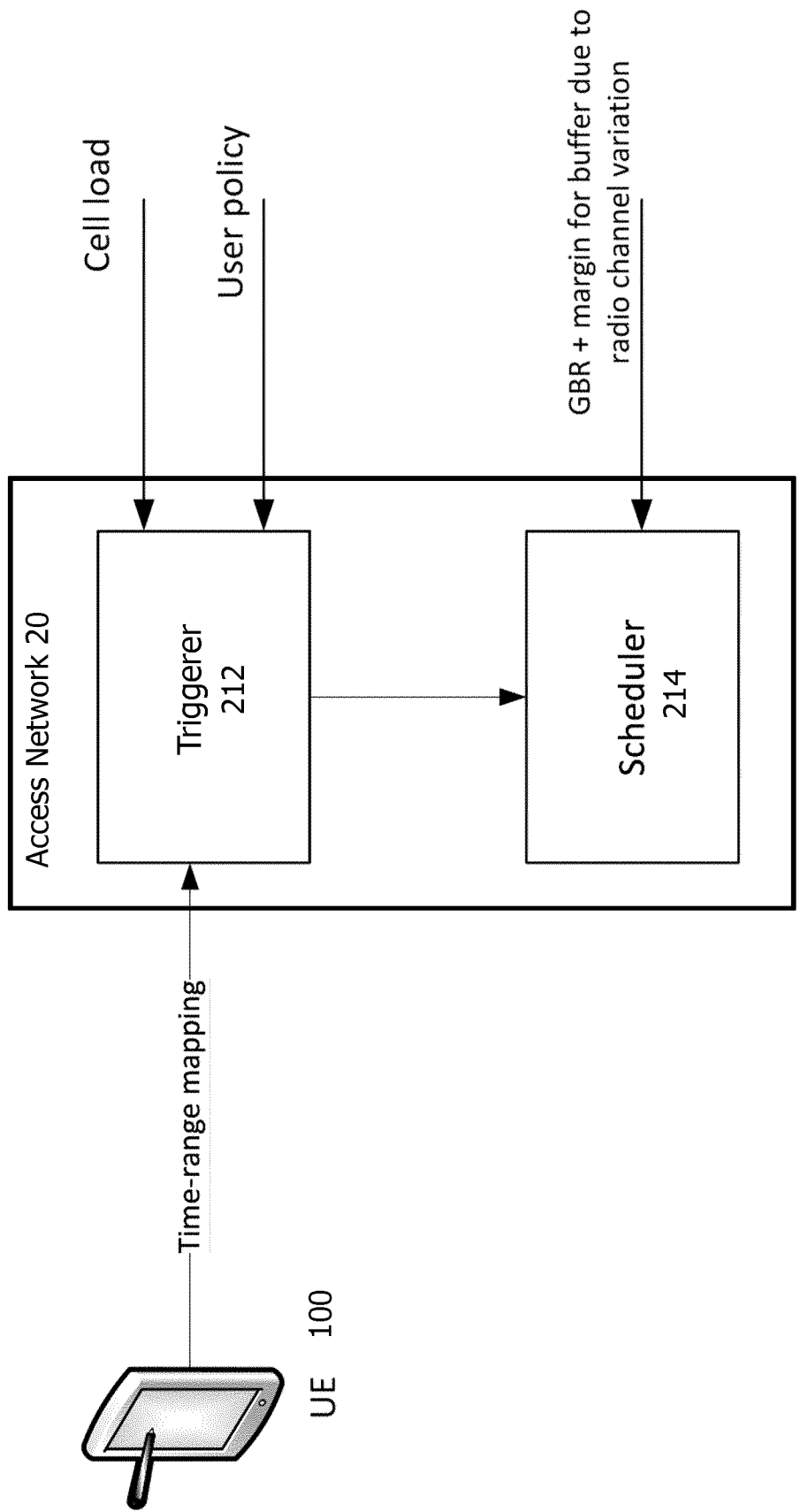
FIG. 5 illustrates an embodiment of a data input scenario for the network component presented herein.

FIG. 5 illustrates in more detail an example of the information processed in the access network 20 in connection with transmission resource distribution. As illustrated in FIG. 5, the access network 20 comprises the triggerer 212 and the scheduler 214, which can be located on the same or on different network components. The triggerer 212 can be considered as a policy controller which triggers transmission resource distribution based on the time-range mapping (i.e., the bitrate variation information) received from the user terminal 100, the load of the cell serving the user terminal 100 and user policy information (as defined, for example, by a user subscription). Based on the time-range mapping, the cell load and the user policy, the triggerer 212 triggers the scheduler 214 to perform a particular transmission resource distribution that will affect the QoE for the user terminal 100. It will be appreciated that one or both of the cell load information and the user policy information can be omitted.

The scheduler 214 performs transmission resource distribution based on the input from the triggerer 212. Specifically, the output of the trigger 212 may assign, or may be used to assign, media data queuing weights to the user terminal 100 and, optionally, further user terminals 100 dependent on the associated bitrate variation information. Specifically, the one or more weights associated with a particular user terminal 100 may be increased in case the variable bitrate information is indicative of a higher transmission resource requirement. As an example, the scheduler 214 may apply a Weighted Fair Queuing (WFQ) in this regard.

Figure 6:
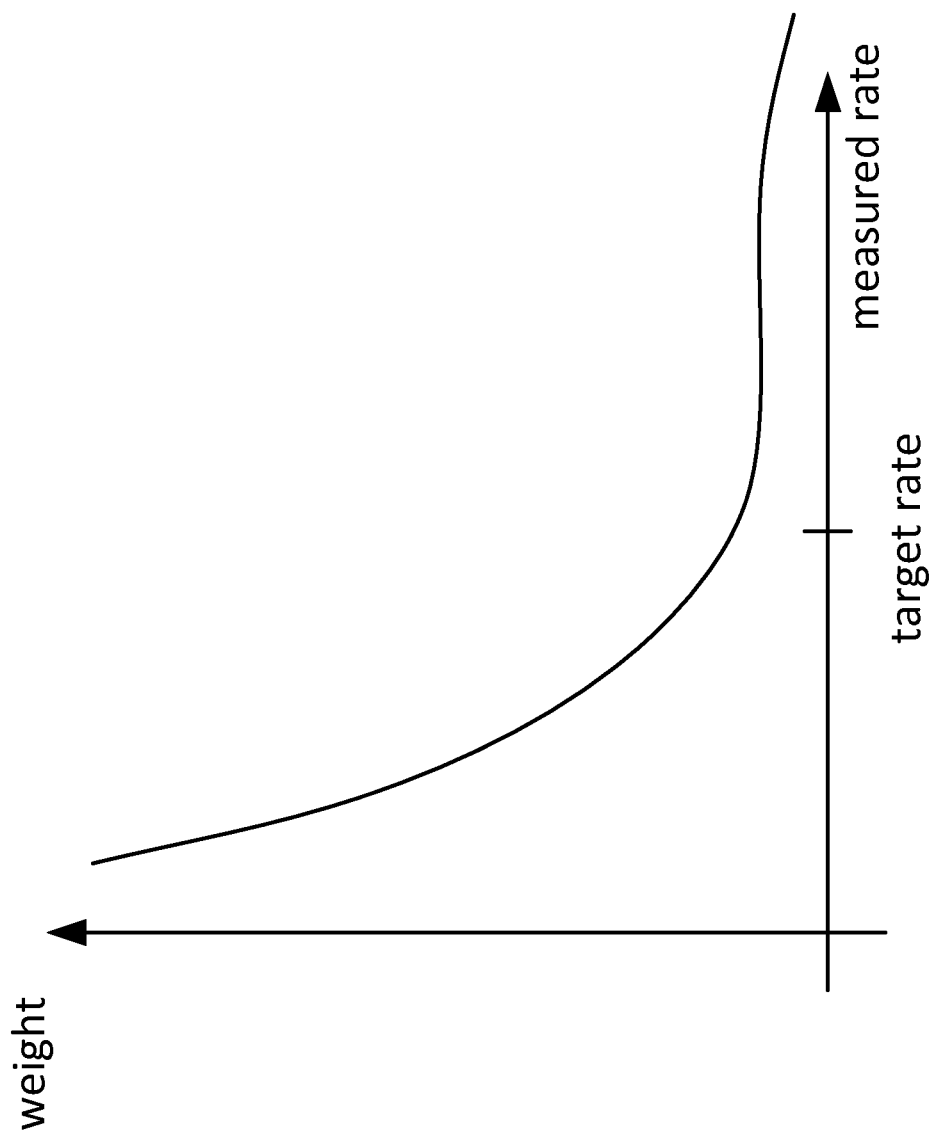
FIG. 6 schematically illustrates a weight function as implemented by the network component presented herein.

FIG. 6 shows an example realization of a Guaranteed Bitrate (GBR)-like scheduling behaviour by implementing the WFQ with a decreasing weight in a function of the distance from a targeted bitrate. This function achieves an output in accordance with a minimum bitrate scheduling. If the measured bitrate of the output function is well below the target rate, then a high weight is assigned to the mobile terminal 100. If the target bitrate is already achieved, then a low wait is assigned. The available transmission resources are distributed among the multiple terminals 100 in accordance with WFQ based on weight modifications dependent on the associated bitrate variation information.

In one variant, the user terminal 100 has a pre-assigned subscription level and the pre-assigned subscription level has a first numerical weight value. Different subscription levels may have different first numerical weight values. Traffic differentiation based on the bitrate variation information may be effected by using a second numerical weight value offsetting a particular first numerical weight value, the second numerical weight value being substantially smaller than the first numerical weight value.

In more concrete terms, the user terminal 100 may have a subscription of one of several different subscription levels (such as gold/silver/bronze). Those subscription levels (first values) can be easily supported by assigning the above weights relatively to an absolute weight of the given subscription level. For instance, the default first weight value of a silver user may be a value of 100, while a bronze user may be assigned a weight value of 50.

In this case, the weight modifications determined from the bitrate variation information (second values) may simply be added to (or subtracted from) these base level values. For instance, a low bitrate encoded media portion obtains a lower weight of, for example, +10, while a high bitrate encoded media portion obtains a higher weight of, for example, +1, or a negative weight. Accordingly, the scheduler 214 in the bottleneck (i.e., the radio access network 20) can take the form of a WFQ scheduler that receives the above summed/subtracted weights and schedules accordingly.

In addition to the GBR, the scheduler 214 may put a safety margin on the bitrate assigned to a particular user terminal 100 compared to the target bitrate resulting from considering the bitrate variation information alone (see FIG. 6). The safety margin ensures that the media buffer on the side of the user terminal 100 can still tolerate certain radio channel fluctuations.

In an exemplary use case, it can be considered that the user terminal 100 performs a video browsing session that is embedded in a Hypertext Mark-up Language 5 (HTML5) page using a Chrome or Chromium or any other browser. The browser will be stored as an application in the memory 104 of the user terminal 100. The user terminal 100 may be equipped with the Android or any other operating system.

The bitrate variation information for the video browsing session can be derived by a QoE manager application stored in the memory 104 from metadata contained in a cache of the browser. Since the browser cache is provided in an un-encrypted form, it can also be read by other applications on the user terminal 100, such as the QoE manager.

The QoE manager application gathers various further items of information that may be transmitted to the communications network 20 to permit an efficient transmission resource distribution. As an example, the information evaluated by the QoE manager application comprises one or more of internal states of applied transport protocols, internal states of a media data rendering application (e.g., a YouTube player), and information obtained from the operating system.

One item of information that is useful for the communications network 20 in connection with transmission resource distribution is a list of used communication sockets at the user terminal 100. This list can be extracted in various ways, for example from the operating system, from the utilised socket list for the YouTube player application or from the YouTube player itself. The socket information may be used for scheduling in the communications network 20 (e.g., the communication sockets may constitute the entities to which the weights are assigned). Information relevant for transmission resource distribution can also be derived from the internal state of a Media Source Extension (MSE) that is responsible for media playback, or from internal browser states. One or more of the corresponding information items can be transmitted by the user terminal 100 to the network component 200, together with or separately from the bitrate variation information.

Bitrate variation information (in the form of, for example, from time-range mappings) is typically only valid for a specific media rendering quality format. The characteristic of the bitrate variation information is content specific, and it is therefore possible to infer the characteristics of one quality to another. In case the network component 200 keeps the characteristics of the bitrate variation information but the bitrate is increased, then the buffer on the side of the mobile terminal 100 will exceed the limit of quality change, and a resolution switch up is likely to occur. If the provided bitrate is decreased, then the buffer will deplete, and a resolution switch down will take place. Accordingly, the technique presented herein may support a rendering quality change during media play-out.

Since the bitrate variation information will be dependent on the media rendering quality format, a media data rendering application, such as the browser 120, will determine a new time-range mapping or other bitrate variation information when a resolution change occurs. A corresponding download can be triggered automatically, thus obtaining all the time-range mappings for all available formats. This may ensure that the highest available resolution of a specific media chunk can be downloaded in a certain transmission resource situation for every time interval.

The present disclosure provides different advantages in different deployments. In many variants, the parties involved (e.g., network operator and user), benefit from the improved QoE, also for end-to-end encrypted traffic. A solution can be provided that does not violate privacy, but reveals bitrate variation information to the network in order for the network operator to perform in-network traffic differentiation and so support target(s) of the executed applications on mobile terminals. For the network operator, a better utilization of existing transmission resources can be achieved while exhibiting improved QoE for end users.

No implementation of the present technique is required on the media server side, while support on the mobile terminal side can be incrementally introduced.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A user terminal, comprising:
an interface configured to receive a stream of variable bitrate encoded media data from a media server via an access network located between the user terminal and the media server;
processing circuitry;
memory containing instructions executable by the processing circuitry whereby the user terminal is operative to:
determine bitrate variation information for the media data stream, wherein the bitrate variation information is determined from or comprises associations between media data play-out time intervals and one of media data frame numbers and media data byte ranges; and
trigger transmission of the bitrate variation information towards a network component in the access network that is configured to trigger dynamic distribution of transmission resources of the access network among multiple user terminals dependent on the variable bitrate information.

2. The user terminal of claim 1, wherein the media data stream is end-to-end encrypted from the media server to the user terminal.

3. The user terminal of claim 1, wherein the bitrate variation information is indicative of the variable bitrate encoding of the media data stream.

4. The user terminal of claim 1, wherein the bitrate variation information is indicative of variable transmission resource requirements for the media data stream.

5. The user terminal of claim 1:
wherein the memory stores an application configured to render the media data stream;
wherein the application is further configured to store metadata pertaining to the media data stream; and
wherein the bitrate variation information is determined from or comprises the stored metadata.

6. The user terminal of claim 1, wherein the instructions are such that the user terminal is operative to determine and trigger transmission of the bitrate variation information at a beginning of a media streaming session.

7. The user terminal of claim 1, wherein the instructions are such that the user terminal is operative to newly determine and trigger transmission of the bitrate variation information while the media data stream is received.

8. The user terminal of claim 7:
wherein the media data stream is configured to be received by the user terminal in one of several media rendering quality formats; and
wherein the instructions are such that the user terminal is operative to newly determine and trigger transmission of the bitrate variation information upon an upcoming or effected change of the media rendering quality format.

9. The user terminal of claim 1, wherein the instructions are such that the user terminal is operative to:
determine at least one communication socket at the user terminal assigned to reception of the media data stream; and
trigger transmission of information indicative of the at least communication socket to the network component.

10. A network component in an access network located between a media server providing one or more streams of variable bitrate encoded media data and one or more user terminals receiving the media data streams, the network component comprising:
an interface configured to receive bitrate variation information for at least one of the one more media data streams from at least one of the user terminals, wherein the bitrate variation information is determined from or comprises associations between media data play-out time intervals and one of media data frame numbers and media data byte ranges;
processing circuitry; and
memory containing instructions executable by the processing circuitry whereby the network component is operative to trigger a distribution of transmission resources of the access network among the one or more user terminals dependent on the bitrate variation information.

11. The network component of claim 10, wherein the media data stream is end-to-end encrypted from the media server to the at least one of the one or more user terminals.

12. The network component of claim 10, wherein the distribution of the transmission resources is further dependent on at least one of: a network load information, terminal-specific information regarding an individual user policy, transmission channel information, and/or fill level information about a terminal-side media data buffer.

13. The network component of claim 10, wherein the instructions are such that the network component is operative to trigger the distribution of the transmission resources among the one or more user terminals by assigning media data queuing weights to the one or more user terminals dependent on the respective bitrate variation information.

14. The network component of claim 10, wherein the transmission resource distribution affects transmission bitrate assignments to the user terminals.

15. The network component of claim 10:
wherein the interface is configured to receive information indicative of at least one communication socket at the at least one of the one or more user terminals assigned to reception of the media data stream; and
wherein the instructions are such that the network component is operative to take into account the at least one communication socket during the distribution of the transmission resources among the one or more user terminals dependent on the bitrate variation information.

16. The network component of claim 10, wherein the network component is located in an access network of a wireless communications system.

17. A media data streaming system, comprising:
a user terminal, comprising:
a first interface configured to receive a stream of variable bitrate encoded media data via a communications network;
first processing circuitry;
first memory containing instructions executable by the first processing circuitry whereby the user terminal is operative to:
determine bitrate variation information for the media data stream, wherein the bitrate variation information is determined from or comprises associations between media data play-out time intervals and one of media data frame numbers and media data byte ranges; and
trigger transmission of the bitrate variation information towards a network component in an access network located between the user terminal and the media server, wherein the network component is configured to trigger dynamic distribution of transmission resources of the access network among multiple user terminals;
the network component, the network component comprising:
a second interface configured to receive the bitrate variation information for at least one of one more media data streams from at least one of the multiple user terminals;
second processing circuitry;
second memory containing instructions executable by the second processing circuitry whereby the network component is operative to trigger a distribution of the transmission resources of the access network among the multiple user terminals dependent on the bitrate variation information.

18. A method of operating a user terminal configured to receive a stream of variable bitrate encoded media data from a media server via an access network located between the user terminal and the media server, the method comprising:
determining bitrate variation information for the media data stream, wherein the bitrate variation information is determined from or comprises associations between media data play-out time intervals and one of media data frame numbers and media data byte ranges; and
triggering transmission of the bitrate variation information towards a network component in the access network that is configured to trigger dynamic distribution of transmission resources of the access network among multiple user terminals.

19. A method of operating a network component in an access network located between a media server providing one or more streams of variable bitrate encoded media data and one or more user terminals receiving the media data streams, the method comprising:
receiving bitrate variation information for at least one of the one more media data streams from at least one of the one or more user terminals, wherein:
the bitrate variation information is indicative of variable bitrate encoding of the media data stream, and
the bitrate variation information is determined from or comprises associations between media data play-out time intervals and one of media data frame numbers and media data byte ranges;
triggering a distribution of transmission resources of the access network among the one or more user terminals dependent on the bitrate variation information.

20. A non-transitory computer readable recording medium storing a computer program product for controlling operation of a user terminal configured to receive a stream of variable bitrate encoded media data from a media server via an access network located between the user terminal and the media server, the computer program product comprising software instructions which, when run on processing circuitry of the user terminal, causes the user terminal to:
determine bitrate variation information for the media data stream, wherein:
the bitrate variation information is indicative of variable bitrate encoding of the media data stream, and
the bitrate variation information is determined from or comprises associations between media data play-out time intervals and one of media data frame numbers and media data byte ranges; and
trigger transmission of the bitrate variation information towards a network component in the access network that is configured to trigger dynamic distribution of transmission resources of the access network among multiple user terminals.

21. A non-transitory computer readable recording medium storing a computer program product for controlling operation of a network component configured to trigger dynamic distribution of transmission resources of a communications network among multiple user terminals for one or more streams of variable bitrate encoded media data, the computer program product comprising software instructions which, when run on processing circuitry of the network component, causes the network component to:
receive bitrate variation information for at least one of the one more media data streams from at least one of the multiple user terminals, wherein:
the bitrate variation information is indicative of variable bitrate encoding of the media data stream, and
the bitrate variation information is determined from or comprises associations between media data play-out time intervals and one of media data frame numbers and media data byte ranges; and
trigger a distribution of the transmission resources among the user terminals dependent on the bitrate variation information.

* * * * *